Patented Sept. 8, 1953

2,651,634

UNITED STATES PATENT OFFICE 2,651,634

PROCESS FOR THE PREPARATION OF 1-BEN-ZYL-5,6,7,8-TETRAHYDROISOQUINOLINE

Hans Henecka, Wuppertal-Elberfeld, Germany, assignor, by mesne assignments, to Farbenfabriken Bayer Aktiengesellschaft, Leverkusen-Bayerwerk, Germany No Drawing. Application December 9, 1950, Serial No. 200,121. In Switzerland December 12, 1949

11 Claims. (Cl. 260—283)

This invention relates generally to therapeutic agents useful as analgesics, together with processes for making such agents. More particularly, the invention relates to analgesic agents which are closely related, both in chemical constitution and therapeutic activity, to the opium alkaloid, morphine.

It has been found that a chemical compound designated N-methylmorphinane by Grewe et al., Ber. 81, 279–86 (1948) and closely related to morphine in chemical structure, produces analgesic effects and has other therapeutically useful properties almost as powerful as morphine itself.

Various procedures for the synthesis of this compound have been proposed, as outlined in the report of the investigations by Grewe et al., above cited, and in further reports by the same workers, but, in general these methods have had the common disadvantage of requiring organometallic compounds as intermediates that could be obtained only with difficulty and by complicated routes of organic synthesis, thus precluding use of these methods in commercial or large scale operations.

For example, it has been suggested to react benzyl magnesium chloride with N-methyl-5,6,7,8-tetrahydroisoquinolinium iodide, which may be prepared by treating 5,6,7,8-tetrahydroisoquinoline with methyl iodide, to produce 2-methyl-1-benzyl-1,2,5,6,7,8-hexahydroisoquinoline, which may be converted to 2-methyl-1-benzyl-1,2,3,4,5,6,7,8-octahydroisoquinoline by catalytic hydrogenation, then causing this compound to undergo intramolecular rearrangement and cyclization by heating it with about ten times its weight of syrupy orthophosphoric acid at 150° C. for a period of three days, to yield the desired N-methyl-morphinane. Another suggested process involves reaction of benzaldehyde with 1-lithium-5,6,7,8-tetrahydroisoquinoline to produce the corresponding carbinol, reducing this carbinol to 1-benzyl-5,6,7,8-tetrahydro-isoquinoline, treating it with methyl iodide to form the corresponding quaternary salt and thereafter reducing this salt and then, by the intramolecular rearrangement and cyclization above mentioned, obtaining the desired N-methyl-morphinane.

One of the chief objects of the present invention is to provide a process for the synthesis of compounds that may be utilized as intermediates in making N-methyl-morphinane and kindred substances, having the advantage over previously known methods of not requiring expensive or difficultly prepared raw materials or other intermediates.

It is also an object of this invention to provide a method for synthesis of compounds of the type mentioned which will readily permit preparation of closely related alkoxy, especially methoxy, substituted compounds by the mere selection of a suitably substituted initial reactant.

Regarded in certain of its broader aspects, the novel process of this invention may be represented as follows:

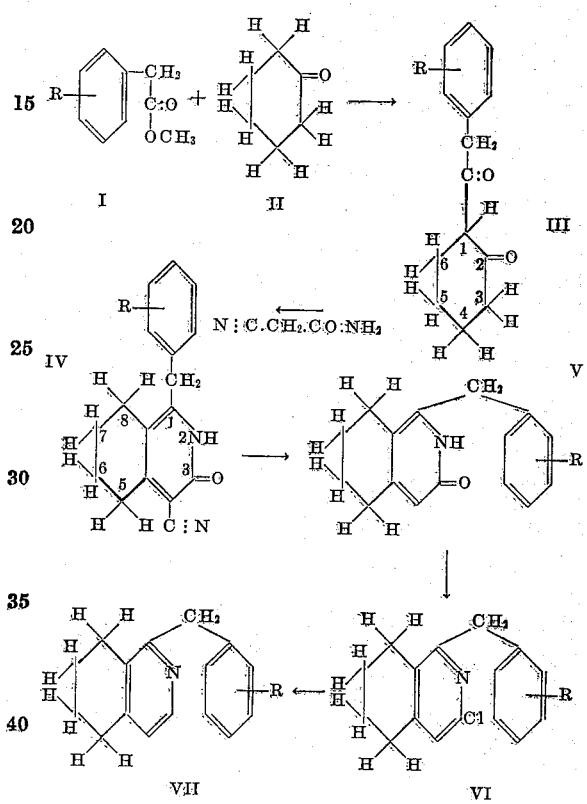

wherein R is at least one substituent of the group consisting of hydrogen and alkoxy.

Regarded in more specific terms, but with reference to the foregoing type-formulae, the process of this invention comprises the condensation of a 2-(α-toluyl)-cyclohexanone (type-formula III), which may be obtained by ester condensation of a phenylacetic ester (type-formula I) with cyclohexanone (type-formula II), with cyanacetamide to yield 1-benzyl-4-cyano-2,3,5,6,7,8-hexahydro-isoquinolone-3 (type-formula IV), removing the nitrile substituent of this compound by mild acid hydrolysis, for example by boiling with aqueous hydrobromic acid, treating this product (type-formula V) with a halogenating agent, for example with a phosphorus oxyhalide, to replace the 3-keto group with a halogen atom (type-formula VI), then reducing this halogen compound to obtain the desired 1-benzyl-5,6,7,8-tetrahydroisoquinoline (type-formula VII). The intermediate compound 1-benzyl-2,3,5,6,7,8 - hexahydro-isoquinolone - 3 (type-formula V above) may also be prepared by condensing $\Delta^{1,2}$ - cyclohexenyl-acetonitrile with phenacetyl chloride in the presence of an aluminum chloride catalyst to obtain $\Delta^{1,2}$-2-($\alpha$-toluyl) cyclohexenyl-acetonitrile, which may be cyclized by heating with syrupy ortho-phosphoric acid to yield the desired product, as described and claimed in this inventor's concurrently filed co-pending application, Serial Number 200,122.

The final product obtained by the process of this invention is useful as an intermediate in the synthesis of N-methyl-morphinane, to which it may be converted by treatment with methyl iodide to form the quaternary salt, reduction of this salt by catalytic hydrogenation to produce 2 - methyl - 1 - benzyl - 1,2,3,4,5,6,7,8-octahydroisoquinoline and treatment of this compound to cause intramolecular rearrangement into the desired final product.

To illustrate an application of the principles of this invention, a typical process will now be described as an example, with the understanding that, by use of suitable alkoxy substituted initial reactants, compounds useful in the synthesis of alkoxy substituted N-methyl-morphinanes may be obtained.

*Example*

33.7 grams of 2($\alpha$-toluyl)-cyclohexanone (boiling point: 145° C. at 0.9 mm. pressure; melting point of the copper salt: 153-154° C.) which may be obtained by condensation of cyclohexanone with phenylacetic acid methyl ester using sodium methylate as condensing agent, is boiled with 14.2 grams of cyanacetamide, 400 cc. of acetone, and 25 grams of potassium carbonate for 15 hours. The acetone is evaporated leaving a residue which, when treated with dilute acid, yields 40 grams of 1 - benzyl - 2,3,5,6,7,8 - hexahydro - 4 - cyano-isoquinolone-3 as fine, colorless needles, melting at 245-248° C. after recrystallization from glacial acetic acid.

About 40 grams of this condensation product are boiled with 400 cc. of hydrobromic acid ($d$=1.49) for 15 hours, then the acid is evaporated in vacuo at 40-50° C., yielding a crystalline residue which, when treated with sodium acetate solution, yields 34.5 grams of 1-benzyl-2,3,5,6,7,8-hexahydro-isoquinolone-3 and this product, after recrystallization from methanol or acetic acid of 50 per cent strength, is obtained as fine needles, melting at 245° C.

About 50 grams of this isoquinolone derivative are heated in a sealed tube for five hours at 155° C. with 250 cc. of phosphorus oxychloride and, after evaporating excess phosphorus oxychloride in vacuo at 60° C., a residue is obtained, from which 1-benzyl-5,6,7,8,-tetrahydro-3-chloro-isoquinoline precipitates when the residue is treated with ice water. The reaction product (boiling at 162° C. at 0.05 mm. pressure) is purified, either by distillation or by recrystallization from dilute methanol or a mixture consisting of ether and petroleum ether, to give bright crystals melting at 87-88° C.

Approximately 50 grams of this chloro-iso- quinoline derivative in 200 cc. of methanol are shaken with hydrogen in the presence of an activated palladium on charcoal catalyst, which may be prepared from 5 cc. of a 10 per cent palladium chloride solution. After absorption of hydrogen has stopped, the catalyst is removed, methanol is evaporated in vacuo, the crystalline residue is dissolved in weakly acidified water and the base is precipitated from the clear solution by adding sodium hydroxide solution. The product, 1-benzyl-5,6,7,8-tetrahydroisoquinoline, is obtained as a somewhat viscous oil, boiling at 143° C. under 0.3 mm. pressure, which yields a picrate with the melting point 132° C. and an acid sulfate with the melting point 214° C. The yields amount to 36 grams.

Having thus described the subject matter of this invention, what it is desired to secure by Letters Patent is:

1. Process for the synthesis of intermediates for the manufacture of therapeutic agents that comprises condensing a phenylacetic ester with cyclohexanone to produce 2-($\alpha$-toluyl)-cyclohexanone, reacting this product with cyanacetamide to form 1-benzyl-2,3,5,6,7,8-hexahydro-4-cyano-isoquinolone-3, subjecting this product to hydrolysis under mildly acidic conditions to effect removal of the substituent cyano group, reacting the product with a phosphorus oxyhalide to replace the substituent 3-keto group with a halogen substituent, reducing this halogen compound by catalytic hydrogenation and recovering 1-benzyl-5,6,7,8-tetrahydroisoquinoline from the reaction mixture.

2. The process as defined in claim 1 wherein the phenylacetic ester is condensed with cyclohexanone in the presence of an alkali metal alcoholate.

3. The process as defined in claim 1 wherein the 2-($\alpha$-toluyl)-cyclohexanone is reacted with cyanacetamide in the presence of an alkali carbonate.

4. The process as defined in claim 1 wherein the hydrolysis of the 1-benzyl-2,3,5,6,7,8-hexahydro-4-cyano-isoquinolone-3 is effected by heating with aqueous hydrobromic acid.

5. The process as defined in claim 1 wherein the phosphorus oxyhalide is phosphorus oxychloride.

6. The process as defined in claim 1 wherein the catalytic hydrogenation is effected by direct action of hydrogen in the presence of an activated palladium on charcoal catalyst.

7. A process for the synthesis of intermediates for the manufacture of therapeutic agents, comprising a step that comprises condensing a phenylacetic ester with cyclohexanone in the presence of an alkali metal alcoholate to produce 2-($\alpha$-toluyl)-cyclohexanone.

8. A process for the synthesis of intermediates for the manufacture of therapeutic agents, comprising a step that comprises reacting 2-($\alpha$-toluyl)-cyclohexanone with cyanacetamide in the presence of an alkali carbonate to form 1-benzyl-2,3,5,6,7,8-hexahydro-4 - cyano - isoquinolone-3.

9. A process for the synthesis of intermediates for the manufacture of therapeutic agents, comprising a step that comprises hydrolyzing 1-benzyl-2,3,5,6,7,8,-hexahydro-4-cyano-isoquinolone-3 to produce 1-benzyl-2,3,5,6,7,8-hexahydro-isoquinolone-3.

10. A process for the synthesis of intermediates for the manufacture of therapeutic agents, comprising a step that comprises reacting 1-benzyl- 2,3,5,6,7,8-hexahydro-isoquinolone-3 with phosphorus oxychloride to produce 1-benzyl-3-chloro-5,6,7,8-tetrahydro-isoquinoline.

11. A process for the synthesis of intermediates for the manufacture of therapeutic agents, comprising a step that comprises catalytically hydrogenating 1-benzyl-3-chloro-5,6,7,8-tetrahydro-isoquinoline and recovering 1-benzyl-5,6,7,8-tetrahydro isoquinoline.

HANS HENECKA.

References Cited in the file of this patent

UNITED STATES PATENTS

| Number | Name | Date |
|---|---|---|
| 2,554,842 | Schnider et al. | May 29, 1951 |

FOREIGN PATENTS

| Number | Country | Date |
|---|---|---|
| 253,710 | Switzerland | Dec. 1, 1948 |

OTHER REFERENCES

Basu et al.: Annalen, vol. 516, pp. 243–248 (1935).

Grewe et al.: Berichte, vol. 81, pp. 279–286 (1948).